(12) United States Patent
Osawa et al.

(10) Patent No.: US 8,678,723 B2
(45) Date of Patent: Mar. 25, 2014

(54) THROW-AWAY ROTATING TOOL

(75) Inventors: Jiro Osawa, Toyokawa (JP); Takuma Aoyama, Toyokawa (JP); Tasuku Itoh, Toyokawa (JP)

(73) Assignee: OSG Corporation, Aichi (JP)

( * ) Notice: Subject to any disclaimer, the term of this patent is extended or adjusted under 35 U.S.C. 154(b) by 0 days.

(21) Appl. No.: 12/734,986

(22) PCT Filed: Aug. 18, 2009

(86) PCT No.: PCT/JP2009/064453
§ 371 (c)(1),
(2), (4) Date: Jun. 7, 2010

(87) PCT Pub. No.: WO2011/021275
PCT Pub. Date: Feb. 24, 2011

(65) Prior Publication Data
US 2012/0155978 A1   Jun. 21, 2012

(51) Int. Cl.
*B23B 51/02* (2006.01)

(52) U.S. Cl.
USPC ........... 408/231; 408/226; 408/233; 408/713; 279/93

(58) Field of Classification Search
USPC .................. 408/226, 230–233, 713; 279/93
IPC ........................................................ B23B 51/02
See application file for complete search history.

(56) References Cited

U.S. PATENT DOCUMENTS

| | | | |
|---|---|---|---|
| 5,957,631 A | 9/1999 | Hecht | |
| 6,276,879 B1 * | 8/2001 | Hecht | 409/234 |
| 6,582,164 B1 * | 6/2003 | McCormick | 408/226 |
| 7,972,094 B2 * | 7/2011 | Men et al. | 408/231 |
| 8,021,088 B2 * | 9/2011 | Hecht | 408/231 |
| 2002/0159851 A1 | 10/2002 | Krenzer | |
| 2005/0084352 A1 | 4/2005 | Borschert et al. | |
| 2006/0072976 A1 | 4/2006 | Frota de Souza | |
| 2006/0127194 A1 * | 6/2006 | Schafer | 408/231 |
| 2008/0193237 A1 * | 8/2008 | Men et al. | 408/226 |
| 2009/0116920 A1 * | 5/2009 | Bae | 408/227 |
| 2012/0121347 A1 * | 5/2012 | Osawa et al. | 408/57 |

FOREIGN PATENT DOCUMENTS

| | | |
|---|---|---|
| JP | 2002-501441 | 1/2002 |
| JP | 2003-505261 | 2/2003 |
| JP | 2003-245813 | 9/2003 |
| JP | 2005-517539 | 6/2005 |
| WO | WO 2008/072840 | 6/2008 |

OTHER PUBLICATIONS

English version of International Search Report issued by JPO for International Application No. PCT/JP2009/064453.

* cited by examiner

*Primary Examiner* — Eric A Gates
(74) *Attorney, Agent, or Firm* — Muramatsu & Associates (57) ABSTRACT

A throw-away rotating tool improves workability of detaching a throw-away tip and prevents from damaging a body. In the throw-away tool, a convex connection for the throw-away tip has protrusions, each of the protrusion includes a sliding contact portion detachably fitted into the inner peripheral groove recessed in the inner peripheral wall of a body. The protrusion has a first tilt portion continuous to the sliding contact portion. In detaching the throw-away tip from the body, the first tilt portion rotates ahead of the sliding contact portion, and a standing portion is elastically deformed due to a wedge effect of the first tilt portion. As a result, the protrusion can be gently removed from the inner peripheral groove.

2 Claims, 9 Drawing Sheets

THROW-AWAY ROTATING TOOL

TECHNICAL FIELD

The present invention relates to a throw-away rotating tool, and more particularly to a throw-away rotating tool which is capable of improving the workability of detaching a throw-away tip, and preventing the detached throw-away tip from colliding with a body to cause the body to be deformed or damaged.

BACKGROUND ART

The throw-away rotating tool is a tool in which the throw-away tip that conducts cutting work is detachably attached to the body. There has been known a conventional throw-away rotating tool in which a cutting head (the throw-away tip) has a convex portion (convex connection) that is larger in diameter on a rear end side, and a tool shank (body) has a concave portion that is smaller in diameter on a leading end side as shown in JP 2002-501441 (see FIGS. 1 and 9, etc.)

The throw-away rotating tool disclosed in JP 2002-501441 is configured so that the throw-away tip is relatively rotated about the axial core until the throw-away tip contacts with a torque transmission wall formed in the body after the convex connection has been inserted into the concave portion in a state where phases of the body and the throw-away tip about the axial core are shifted from each other, to thereby connect the convex connection and the concave portion together by the aid of elastic deformation of the concave portion of the body. In the technique disclosed in JP 2002-501441, a travel of the throw-way tip in the axial direction is regulated by engagement of the convex connection and the concave portion. Also, a travel of the throw-away tip in a rotating direction of the body at the time of cutting is regulated by making the throw-away tip in contact with the torque transmission wall.

However, a travel of the throw-away tip in an opposite direction to the rotating direction of the body at the time of cutting is merely regulated by a frictional force developed between an outer peripheral surface of the convex connection of the throw-away tip and an inner peripheral surface of the concave portion of the body. When the inner peripheral surface of the concave portion is worn due to attachment/detachment of the throw-away tip or vibration during the cutting work, the frictional force is reduced so that the throw-away tip may come free from the body before the cutting edge of the throw-away tip reaches a tool lifetime. In that case, the body must be replaced with a fresh one ahead of the throw-away tip.

Under the circumstances, there has been disclosed a drill (throw-away rotating tool) that includes a cutting tip 2 (the throw-away tip) having a first longitudinal portion 15 (convex connection) projected on a rear end surface thereof, and a drill shaft 1 (body) having an accommodation concave portion in which the first longitudinal portion 15 (convex connection) is accommodated formed on a front end surface. The drill also includes a thread surface 16 projected on an outer peripheral surface of the first longitudinal portion 15 (convex connection), and an opposed surface 19 that is recessed in the inner peripheral surface of the accommodation concave portion 10, and engages with the thread surface 16 as shown in JP 2003-505261 (see FIGS. 3 and 4, etc.).

In the technique disclosed in JP 2003-505261, the first longitudinal portion 15 (convex connection) is fitted into the accommodation concave portion 10, and the cutting tip 2 (the throw-away tip) is screwed in a direction opposite to the rotating direction of the drill shaft 1 (body) to press up the thread surface 16 toward the opposed surface 19 while the rear end surface of the cutting tip 2 (the throw-away tip) is pressed against the front end surface of the drill shaft 1 (body) to fix the cutting tip 2 (the throw-away tip). The fixation is further reinforced during operation of the drill (throw-away rotating tool)

DISCLOSURE OF THE INVENTION

Problems to be Solved by the Invention

However, in the technique disclosed in JP 2003-505261, the thread surface 16 of the cutting tip 2 (the throw-away tip) is more cut into the body like a wedge as the cutting work is conducted more, and the fastening force is increased. In exchanging the throw-away tip, the throw-away tip must be first detached from the body. In order to achieve this, there is a need to apply a considerable force against the fastening force of the thread surface 16 and the opposed surface 19 in a direction opposite to the rotating direction of the cutting work. Because the fastening force is large, there arises such a problem that detachment of the throw-away tip from the body is difficult.

Also, when a force applied in the direction opposite to the fastening direction of the throw-away tip exceeds the fastening force in detaching the throw-away tip from the body, the thread surface is rapidly released from the opposed surface, and the throw-away tip comes free from the body. Because the force applied in the opposite direction to the fastening direction is large, and the thread surface is rapidly released, a travel speed of the throw-away tip that has come free from the body is large. For that reason, there arises such a problem that a finger may be cut by the cutting edge of the throw-away tip. Also, when the first longitudinal portion 15 (convex connection) or the thread surface of the throw-away tip collides with the accommodation concave portion 10 and the opposed surface 19 of the body at the moment when the throw-away tip comes free from the body, because the momentum of the throw-away tip is large, the accommodation concave portion 10 and the opposed surface 19 of the body may be deformed or damaged. In that case, there arises such a problem that the body cannot be repetitively used, and must be exchanged together with the throw-away tip, and the advantages of the throw-away rotating tool cannot be taken.

The present invention has been made to solve the above-described problems, and aims at providing a throw-away rotating tool which is capable of improving the workability of detaching a throw-away tip, and preventing the detached throw-away tip from colliding with a body to cause the body to be deformed or damaged.

Means for Solving the Problem

For solving the problem, a throw-away rotating tool according to the first aspect of the invention comprises: a body having a plurality of standing portions that erect around an axial core thereof at intervals; and a throw-away tip made of a material harder than the body and having a convex connection projected on a rear end thereof, in which the convex connection is inserted into the inside of the standing portions, and relatively rotated about the axial core to connect the convex connection and the standing portions. Each of the standing portions has an inner peripheral groove orthogonal to the axial core and recessed in an inner peripheral wall thereof. The convex connection has a protrusion configured to be projected from an outer peripheral wall thereof and detachably fitted into the inner peripheral groove, and formed with a sliding contact portion of the inner peripheral groove which contacts with a wall of a leading end side of the body. The protrusion has a first tilt portion continuous to a rear side of rotation of the sliding contact portion of the throw-away tip that is relatively rotated, where the first tilt portion is tilted downward from the sliding contact portion toward a rear end side of the throw-away tip.

According to the second aspect of the invention, in the throw-away rotating tool according to the first aspect, the protrusion has a second tilt portion continuous to a front side of rotation of the throw-away tip that is relatively rotated, and the second tilt portion is tilted downward from the sliding contact portion toward a rear end side of the throw-away tip.

According to the third aspect of the invention, in the throw-away rotating tool according to the second aspect, the body has a first surface formed on the leading end side of each of the standing portions in a direction crossing to the axial core, and the throw-away tip has a first receiving portion which is projected toward the outer peripheral side from the convex connection in the direction crossing to the axial core, and contacts with the first surface when the convex connection and the standing portions are connected to each other. The first receiving portion is formed at a position where the leading end side of rotation laps over the first surface when the throw-away tip is relatively rotated about the axial core, and the sliding contact portion contacts with the wall of the inner peripheral groove.

Effects of the Invention

According to the throw-away rotating tool in the first aspect of the invention, the plurality of standing portions that erect around the axial core of the body at intervals each having an inner peripheral groove that intersects with the axial core and is recessed in the inner peripheral wall, and the convex connection projected on the rear end side of the throw-away tip has protrusions configured to be projected from the outer peripheral wall and detachably fitted into the inner peripheral grooves. Therefore, the convex connection is inserted into the inside of the standing portions, and relatively rotated around the axial core, to thereby fit the protrusions projected on the outer peripheral wall of the convex connection into the inner peripheral groove recessed in the inner peripheral wall of each standing portion so that the convex connection and the standing portions can be coupled together. Since the throw-away tip is made of a material harder than that of the body, when the protrusions are fitted into the inner peripheral grooves recessed in the inner peripheral walls of the standing portions, the standing portions of the body are elastically deformed, and slightly tilted outward. A reaction force of the standing portions that are elastically deformed allows the sliding contact portion of the protrusions to be pressed against the wall of the inner peripheral grooves, and the throw-away tip is fixed to the body.

In this example, since the inner peripheral grooves are recessed so as to intersect with the axial core, and have no lead angle of the screw, the coupling (fastening) of the throw-away tip and the body is prevented from being enforced by conducting the cutting work. As a result, in exchanging the throw-away tip, the throw-away tip can be easily detached from the body with the effect to improve the detaching workability.

Also, in order to detach the throw-away tip fixed to the body therefrom, there is a need that the throw-away tip is relatively rotated in the direction opposite to the direction for attaching the throw-away tip to the body, and the protrusions projected on the convex connection of the throw-away tip are removed from the inner peripheral grooves recessed in the standing portions of the body. In this case, the protrusions are each provided with a first tilt portion continuous to the backward side of rotation of the sliding contact portion of the throw-away tip, and tilted downward toward the rear end side of the throw-away tip. Therefore, when a force allowing the throw-away tip to be relatively rotated with respect to the body is applied, the first tilt portion received in the inner peripheral groove rotates ahead of the sliding portion. Since the neighborhood of the sliding contact portion of the first tilt portion that rotates ahead abutts against the wall of the inner peripheral groove, the standing portions of the body are elastically deformed by the wedge effect so as to be slightly tilted outward. As a result, the force allowing the sliding contact portion continuous to the first tilt portion to be pressed against the wall of the inner peripheral groove is reduced so that the sliding contact portion of the protrusion can be gently removed from the inner peripheral groove.

As a result, the motion and speed of the throw-away tip detached from the body can be so controlled as to prevent a finger from being cut by the cutting edge, and prevent the throw-away tip from colliding with the body. Also, because the momentum of the detached throw-away tip can be reduced, even if the throw-away tip collides with the body, the body can be prevented from being deformed or damaged.

According to the throw-away rotating tool in the second aspect of the invention, in addition to the effects of the throw-away rotating tool of the first aspect, each protrusion has the second tilt portion that is continuous to the forward side of rotation of the sliding contact portion of the throw-away tip that relatively rotates, and tilted downward on the rear end side of the throw-away tip. Therefore, when the throw-away tip is attached to the body, the second tilt portion that has been fitted into the inner peripheral groove travels within the inner peripheral groove ahead of the sliding contact portion. By the wedge effect of the second tilt portion that travels ahead, the standing portions of the body are elastically deformed so as to be slightly tilted outward, and the force allowing the sliding contact portion continuous to the second tilt portion to be pressed against the wall of the inner peripheral groove can be reduced. This leads to the effect that the sliding contact portion of each protrusion can be gently fitted into the inner peripheral groove.

According to the throw-away rotating tool in the third aspect of the invention, in addition to the effects of the throw-away rotating tool of the second aspect, the body has a first surface formed in a direction intersecting with the axial core on the leading end side of each standing portion. The throw-away tip is provided with a first receiving portion that is projected toward the outer peripheral side from the convex connection in a direction intersecting with the axial core, and contacts with the first surface when the convex connection and the standing portions are coupled with each other. Therefore, when the sliding contact portion of each protrusion is fitted into the inner peripheral groove, the wall of the inner peripheral groove and the first surface are held between the sliding contact portion and the first receiving portion of the throw-away tip, and the throw-away tip is coupled with the body.

In this example, the first receiving portion is formed at a position where the leading end side of rotation laps over the first surface when the throw-away tip is relatively rotated, and the sliding contact portion contacts with the wall of the inner peripheral groove. Therefore, the sliding contact portion contacts with the wall of the inner peripheral groove, and the wall of the inner peripheral groove and the first surface are held between the sliding contact portion and the first receiving portion of the throw-away tip, and the throw-away tip is held by the body. Then, a larger force is applied to a replacement tool attached to the throw-away tip to rotate the throw-away tip, with the result that the sliding contact portion of each protrusion is fitted into the inner peripheral groove so that the throw-away tip can be completely coupled with the body.

As described above, in the work of attaching the throw-away tip to the body, the protrusions are made to enter the inner peripheral grooves by a slight force due to the wedge effect of the second tilt portion until the sliding contact portion of each protrusion contacts with the wall of the inner peripheral groove, and then the replacement tool is gripped, and a large force is applied to the throw-away tip so as to be coupled with the body. When the sliding contact portion of each protrusion contacts with the wall of the inner peripheral groove, the throw-away tip is held by the body. Therefore, even if the replacement tool is regripped, a trouble that the throw-away tip comes free from the body can be prevented. Accordingly, there is an advantage that the work of attaching the throw-away tip to the body can be improved in stability.

BRIEF DESCRIPTION OF THE DRAWINGS

FIG. 4($a$) is a front view showing protrusions of the throw-away tip, and FIG. 4($b$) is a cross-sectional end view showing the protrusions taken along a line IVb-IVb of FIG. 4($a$).

FIG. 7($a$) is a schematic view showing the body and the throw-away tip, and FIG. 7($b$) is a schematic view showing the throw-away tip held by the body.

FIG. 8($a$) is a front view showing a protrusion of a throw-away tip in a throw-away rotating tool according to a second embodiment of the present invention, FIG. 8($b$) is a front view showing a protrusion of a throw-away tip in a throw-away rotating tool according to a third embodiment of the present invention, FIG. 8($c$) is a front view showing a protrusion of a throw-away tip in a throw-away rotating tool according to a fourth embodiment of the present invention, and FIG. 8($d$) is a cross-sectional end view showing the protrusion taken along a line VIIId-VIIId in FIG. 8($a$).

EXPLANATION OF REFERENCE NUMERALS AND SYMBOLS 1, 101: throw-away rotating tool
10, 110: body
13: standing portion
13$a$: inner peripheral wall
13$b$: inner peripheral groove
13$c$: wall
13$d$: first surface
20, 120: throw-away tip
23: convex connection
23$a$: outer peripheral wall
23$c$: first receiving portion 25, 26, 27, 28: protrusion
25$a$, 26$a$, 27$a$, 28$a$: sliding contact portion
25$b$, 26$b$, 27$b$, 28$b$: first tilt portion
25$c$, 26$c$, 27$c$, 28$c$: second tilt portion
O: axial core

BEST MODE FOR CARRYING OUT THE INVENTION

Figure 1:
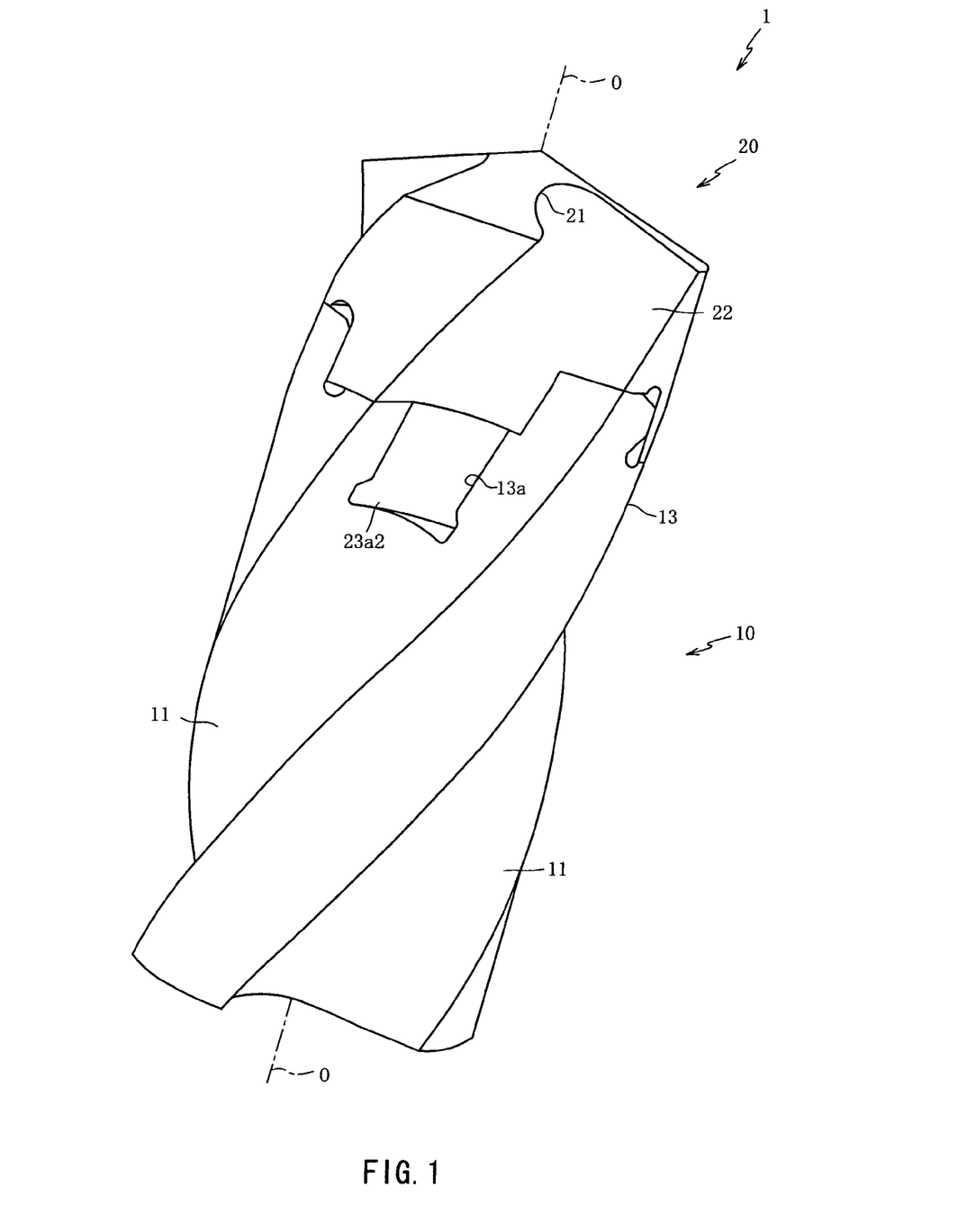
FIG. 1 is a perspective view showing a throw-away rotating tool according to a first embodiment of the present invention.

Hereinafter, preferred embodiments of the present invention will be described with reference to the accompanying drawings. FIG. 1 is a perspective view showing a throw-away rotating tool 1 according to a first embodiment of the present invention. In FIG. 1, diagrammatic representation of an axial length of a body 10 is omitted.

First, a general configuration of a throw-away rotating tool 1 will be described with reference to FIG. 1. As shown in FIG. 1, the throw-away rotating tool 1 is configured to include the body 10 and a throw-away tip 20 that is attached to the body 10. The throw-away rotating tool 1 is a rotating tool to which a rotating force of a processing machine such as a machining center is transmitted through a holder (not shown) that holds the body 10 to conduct a cutting work on a workpiece.

The body 10 is configured to transmit the rotating force of the processing machine to the throw-away tip 20, and formed of a substantially shaft-like body made of high-speed tool steel, and one end of the body 10 is attached to the processing machine through the above-mentioned holder. In this embodiment, first grooves 11 for discharging swarf during cutting work are defined in an outer peripheral surface of the body 10.

The throw-away tip 20 is configured to cut the workpiece with cutting edges 21 disposed on a leading end thereof. The throw-away tip 20 is made of a cemented carbide harder than the body 10, and detachably attached to the body 10. As a result, even if the cutting edges 21 reach a lifetime, the cutting work can be continued by replacing the existing tip with another tip with no need to again grind the throw-away tip 20. In this embodiment, the throw-away tip 20 is also provided with second grooves 22 for discharging swarf during the cutting work, and configured so that the second grooves 22 are continuous to the first grooves 11 when the throw-away tip 20 is attached to the body 10. In this embodiment, the throw-away tip 20 has three cutting edges 21 and three second grooves 22.

Figure 2:
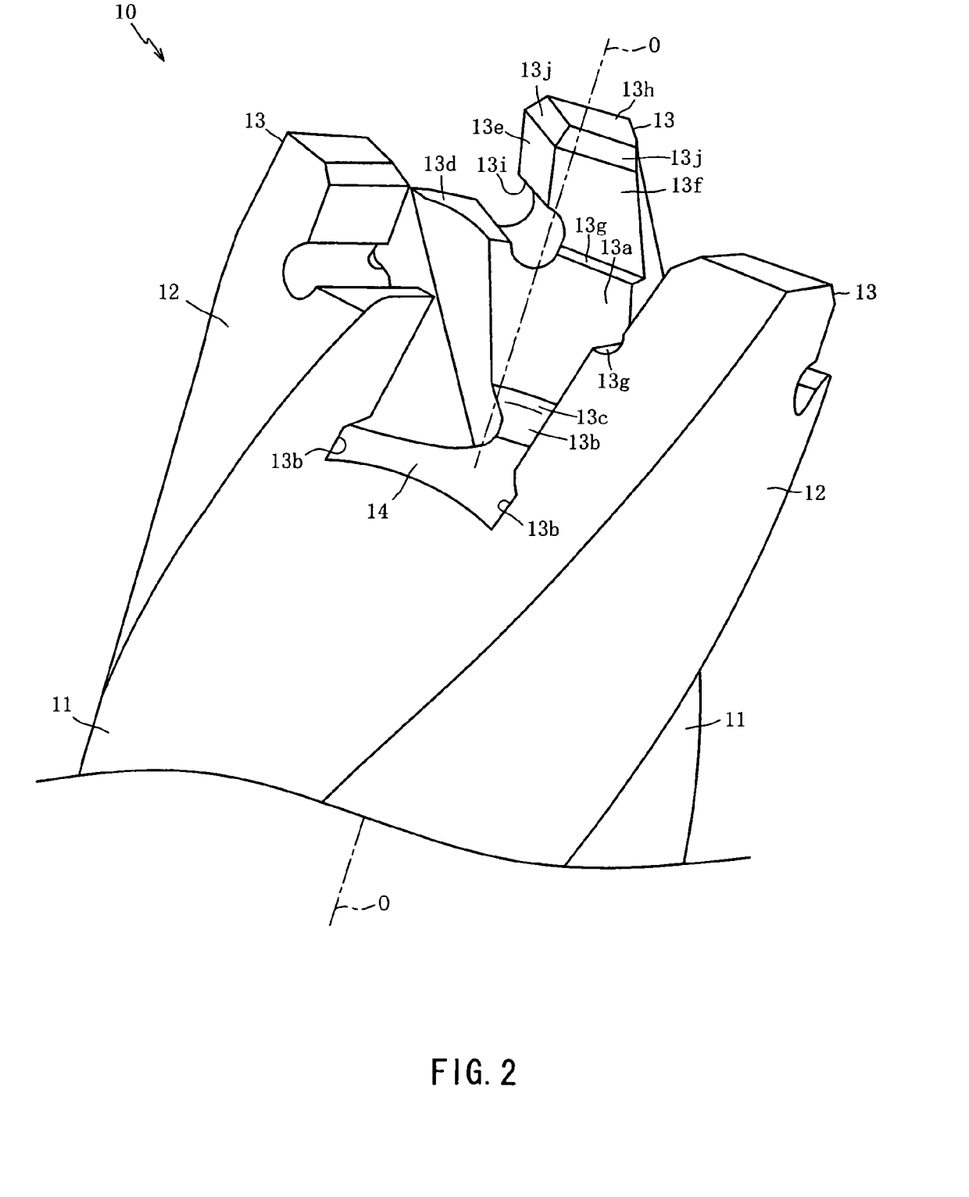
FIG. 2 is a perspective view showing a body of the throw-away rotating tool.

Now, the detailed configuration of the body 10 will be described with reference to FIG. 2. FIG. 2 is a perspective view showing the body 10 of the throw-away rotating tool 1. In FIG. 2, the diagrammatic representation of an axial length of the body 10 is omitted. The body 10 is configured to mainly include a plurality of (three in this embodiment) standing portions 13 each extending with a land 12 as an outer peripheral surface, and parts of the first grooves 11 as side surfaces, and erecting around an axial core O with a torsion angle of the first grooves 11, and a bottom 14 located on a rear end side of the standing portions 13. The standing portions 13 are portions for holding the throw-away tip 20, and a convex connection 23, which will be described later, of the throw-away tip 20 which will be described later is inserted into the inside of the standing portions 13. Also, the bottom 14 is formed orthogonally to the axial core O of the body 10.

The standing portions 13 are each formed with an inner peripheral wall 13$a$ as an assembly of arc curvatures having the same radius about the axial core O. Each inner peripheral wall 13$a$ has an inner peripheral groove 13$b$ recessed along the bottom 14 orthogonally to the axial core O. The inner peripheral groove 13$b$ has a wall 13$c$ facing the bottom 14. As described above, since the inner peripheral groove 13b is formed on a rear end side (bottom 14 side) of the inner peripheral wall 13a of each standing portion 13, a thickness (wall thickness) of each standing portion 13 on the rear end side can be reduced by a depth of the inner peripheral groove 13b. As a result, the amount of elastic deformation of the standing portions 13 which are tilted outward (in a direction away from the axial core O) can be increased. Thus, the attachment and detachment of the convex connection 23, which will be described later, in the throw-away tip 20 can be facilitated, and the retaining force of the throw-away tip 20 by the standing portions 13 can be increased.

Each of the standing portions 13 has a first surface 13d, which is formed to be substantially orthogonal to the axial core O and substantially parallel to the bottom 14, on a leading end side of the standing portion 13 and on a forward side of rotation of the body 10 during the cutting work. A torque transmission wall 13e is erected on the first surface 13d on a backward side of rotation of the body 10 during the cutting work so as to be substantially perpendicular or acute-angled with respect to the first surface 13d. A width of the torque transmission wall 13e is formed to be slightly narrower than a width of the first surface 13d in the rotating direction of the body 10 during the cutting work.

Each of inner peripheral wall step surfaces 13f is a portion that intersects with the torque transmission wall 13e on a ridge line, and is formed on a leading end side of each standing portion 13 with the torsion angle of the first grooves 11 as an assembly of arc curvatures having the same radius about the axial core O. The radius of the inner peripheral wall step surface 13f about the axial core O is configured to be larger than the radius of the inner peripheral wall 13a. As a result, each inner wall step surface 13f is continuous to the inner peripheral wall 13a through a second surface 13g extending from the first surface 13d on the same plane as the first surface 13d. Further, each standing portion 13 includes, at a top thereof, a third surface 13h that intersects with the torque transmission wall 13e and the inner peripheral wall step surface 13f, and is configured by a surface that is substantially parallel to the first surface 13d and the second surface 13g. The first surfaces 13d, the second surfaces 13g, and the third surfaces 13h formed on the respective standing portions 13 are formed on the same planes, respectively.

A recess portion 13i is formed over the width direction of the first surface 13d in a portion where each first surface 13d and each torque transmission wall 13e intersect with each other. The recess portion 13i formed in the portion where each first surface 13d and each torque transmission wall 13e intersect with each other enables an easy surface treatment such as grinding on the first surface 13d and the torque transmission wall 13e to improve the productivity. Also, the first surface 13d is tapered on a side opposite to the torque transmission wall 13e on the down grade. With this configuration, in attaching the throw-away tip 20 which will be described later, the first receiving portion of the throw-away tip 20 can be slid without hitting the first surface 13d. Also, chamfers 13j are formed on a portion where the third surface 13h intersects with the torque transmission wall 13e, and a portion where the third surface 13f intersects with the inner peripheral wall step portion 13f, respectively. As a result, the third surfaces 13h, the torque transmission walls 13e, and the inner peripheral wall step portions 13f can be prevented from being damaged by tipping so as to improve the durability of the body 10.

Figure 3:
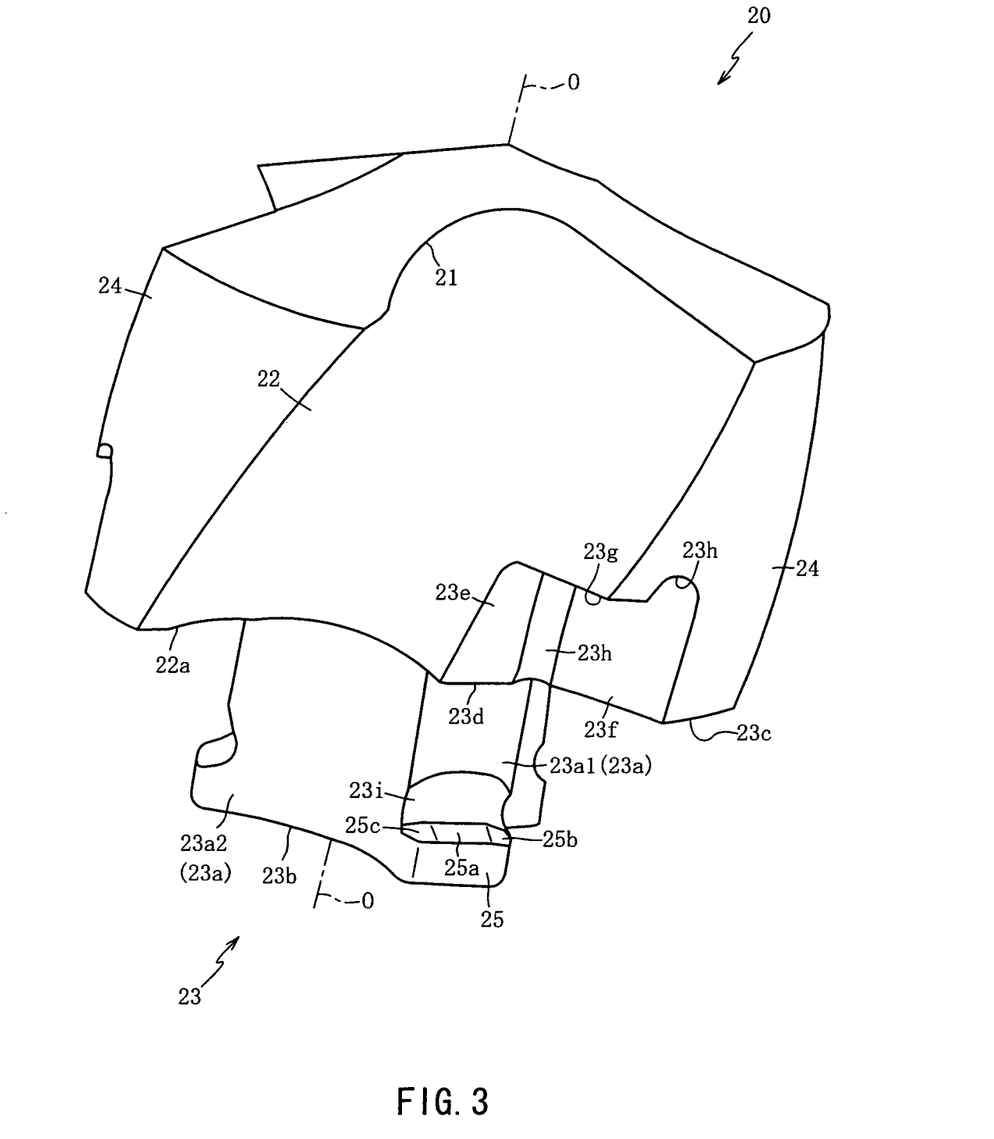
FIG. 3 is a perspective view showing a throw-away tip of the throw-away rotating tool.

Now, the detailed configuration of the throw-away tip 20 will be described with reference to FIG. 3. FIG. 3 is a perspective view of the throw-away tip 20 in the throw-away rotating tool 1. As shown in FIG. 3, the throw-away tip 20 is configured to mainly include the cutting edges 21 at a front end thereof, and the shaft-shaped convex connection 23 projected on a rear end thereof (a side opposite to a side where the cutting edges 21 are provided).

An outer peripheral wall 23a of the shaft-shaped convex connection 23 includes outer peripheral wall sliding contact portions 23a1 that are embayed in a direction orthogonal to the axial core O, and contact with at least parts of the inner peripheral walls 13a of the standing portions 13 of the body 10, and outer peripheral wall groove portions 23a2 each having an outer edge formed inside an edge portion 22a of each second groove 22 of the throw-away tip 20, taken from a planar view (viewed from a direction of the axial core O) so that the outer peripheral wall sliding contact portions 23a1 and the outer peripheral wall groove portions 23a2 are alternately arranged around the axial core O. Since at least parts of the outer peripheral wall sliding contact portions 23a1 contact with the inner peripheral walls 13a of the standing portions 13 of the body 10, the outer peripheral wall sliding contact portions 23a1 of the convex connection 23 are held between the inner peripheral walls 13a of the standing portion 13. Also, since the outer edges of the outer peripheral wall groove portions 23a2 are formed inside the edge portions 22a of the second grooves 22 in the throw-away tip 20 in the planar view, when the throw-away tip 20 and the body 10 are coupled with each other, the outer peripheral wall groove portions 23a2 can be prevented from protruding from the first grooves 11 of the body 10 as shown in FIG. 1. As a result, the throw-away rotating tool 1 can smoothly discharge swarf from the second grooves 22 and the first grooves 11.

The throw-away tip 20 has first receiving portions 23c that project from the outer peripheral walls 23a in a direction orthogonal to the axial core O and intersect with the lands 24, at positions displaced by the torsion angles of the first groove 11 and the second groove 22 at the leading end side (side opposite to the rear end portion 23b) of the convex connection 23. Also, protrusions 25 each having a sliding contact portion 25a are projected from the rear end portion 23b of the outer peripheral wall sliding contact portion 23a1 of the convex connection 23. The protrusions 25 are portions that are inserted into the inner peripheral grooves 13b recessed in the inner peripheral walls 13a of the standing portions 13 of the body 10. A distance from the sliding contact portion 25a of each protrusion 25 to each first receiving portion 23c in a direction parallel to the axial core O is set to be substantially equal to a distance from the wall 13c of each inner peripheral groove 13b of the body 10 to each first surface 13d in a direction parallel to the axial core O. With this configuration, the first receiving portions 23c can contact with the first surfaces 13d of the body 10.

Also, the throw-away tip 20 has second receiving portions 23d extending from the first receiving portions 23c on the same plane as the first receiving portions 23c. Each second receiving portion 23d is a portion that projects from the outer peripheral wall sliding contact portion 23a1 of the convex connection 23 in a direction orthogonal to the axial core O, and contacts with the second surfaces 13g of the body 10.

Outer peripheral wall step portions 23e are portions whose distance from the axial core O is set to be larger than a distance from the axial core O to the outer peripheral wall sliding contact portions 23a1, and smaller than a distance from the axial core O to the lands 24, and which intersect with the second receiving portions 23d. Also, the outer peripheral wall step portions 23e are portions which at least partially contact with the inner peripheral wall step portions 13f of the standing portions 13 of the body 10. With this configuration, each of the outer peripheral wall step portions 23e is held between the inner peripheral wall step portions 13f of the standing portion 13 of the body 10. Also, each of transmission wall receiving portions 23f stands on the outer peripheral wall step portion 23e on a forward side of rotation of the throw-away tip 20 during the cutting work so that an angle to the first receiving portion 23c is substantially perpendicularity or an acute angle. The transmission wall receiving portions 23f are portions that contact with the torque transmission walls 13e of the body 10.

Further, the throw-away tip 20 has third receiving portions 23g that intersect with the transmission wall receiving portions 23f and the outer peripheral wall step portions 23e, and configured by a surface substantially parallel to the first receiving portions 23c and the second receiving portions 23d. A distance from the sliding contact portions 25a of the protrusions 25 to the third receiving portions 23g in a direction parallel to the axial core O is set to be substantially the same as a distance from the wall portions 13c of the inner peripheral grooves 13b of the body 10 to the third surfaces 13h in a direction parallel to the axial core O. With this configuration, the third receiving portions 23g can contact with the third surfaces 13h of the body 10.

The first receiving portions 23c, the second receiving portions 23d, and the third receiving portions 23g are rotationally symmetrically formed about the axial core O at given positions of the throw-away tip 20, and also formed on the same planes, respectively. Also, recesses 23h are formed in portions where the transmission wall receiving portions 23f and the third receiving portions 23g intersect with each other, and portions where the transmission wall receiving portions 23f and the outer peripheral wall step portions 23e intersect with each other. The recesses 23h facilitate a surface treatment such as grinding of the transmission wall receiving portions 23f, the third receiving portions 23g, and the outer peripheral wall step portions 23e, to thereby improve the productivity.

As described above, the convex connection 23 has the protrusions 25 projected from the outer peripheral wall sliding contact portions 23a1 on the rear end portion 23b in a direction away from the axial core O. In this embodiment, the protrusions 25 project from three directions of the convex connection 23. Also, in this embodiment, a height from the rear end portion 23b of each convex connection 23 to the sliding contact portion 25a of each protrusion 25 is formed to be slightly larger than a height from the bottom 14 of the body 10 to the wall 13c of each inner peripheral groove 13b. With this configuration, since the rear end portion 23b of the throw-away tip 20 rotates while abuts against the bottom 14 of the body 10, and the protrusions 25 are fitted into the inner peripheral grooves 13b, the standing portions 13 are slightly elastically deformed. Recesses 23i are formed in the neighborhoods of boundaries of the protrusions 25 and the outer peripheral wall sliding contact portions 23a1. The recesses 23i facilitate a surface treatment such as cutting of the protrusions 25.

The protrusions 25 are each configured to include the sliding contact portion 25a that contacts with the wall 13c of the inner peripheral groove 13b recessed in each inner peripheral wall 13a of the body 10, a first tilt portion 25b continuous to each sliding contact portion 25a on the backward side of rotation of the throw-away tip 20 when the throw-away tip 20 is attached to the body 10, and a second tilt portion 25c continuous to an opposite side of the first tilt portion 25b. The first tilt portions 25b and the second tilt portions 25c are each tilted downwardly from the sliding contact portion 25a toward the rear end side (an opposite side of a side where the cutting edges 21 are disposed) of the throw-away tip 20.

Figure 4A:
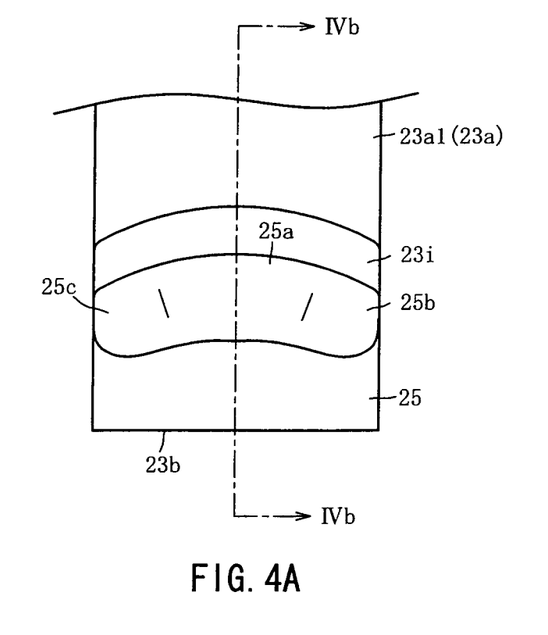
Figure 4B:
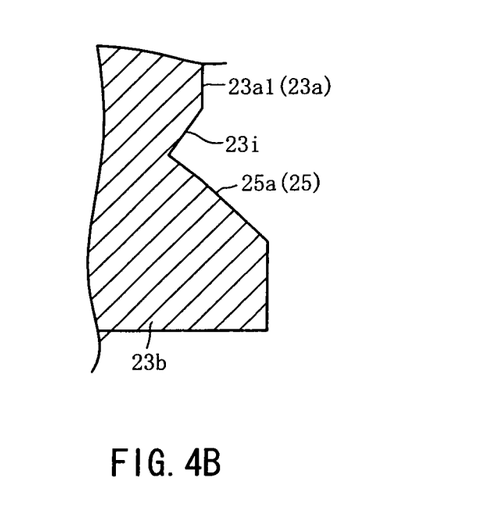

Referring to FIG. 4, the protrusions 25 will be further described. FIG. 4(a) is a front view of each protrusion 25 in the throw-away tip 20, and FIG. 4(b) is a cross-sectional end view of the protrusion 25 taken along a line IVb-IVb in FIG. 4(a). In FIG. 4, the diagrammatic representation of the outer peripheral wall groove portion 23a2 of the convex connection 23 is omitted.

As shown in FIGS. 4(a) and 4(b), the sliding contact portion 25a, the first tilt portion 25b, and the second tilt portion 25c are configured as substantially a cone (a part of a side surface of the cone) as a whole. Since the recesses 23i are formed in the neighborhoods of boundaries of the protrusions 25 and the outer peripheral wall sliding contact portions 23a1, the sliding contact portions 25a, the first tilt portions 25b, and the second tilt portions 25c can be cut at the same time while the recesses 23i are formed by ball end milling. Thus, the throw-away tip 20 having the protrusions 25 can be easily manufactured. Also, since the sliding contact portion 25a, the first tilt portion 25b, and the second tilt portion 25c are configured as substantially a cone as a whole, the protrusions 25 can be easily fitted into the inner peripheral grooves 13b of the body 10.

Figure 5:
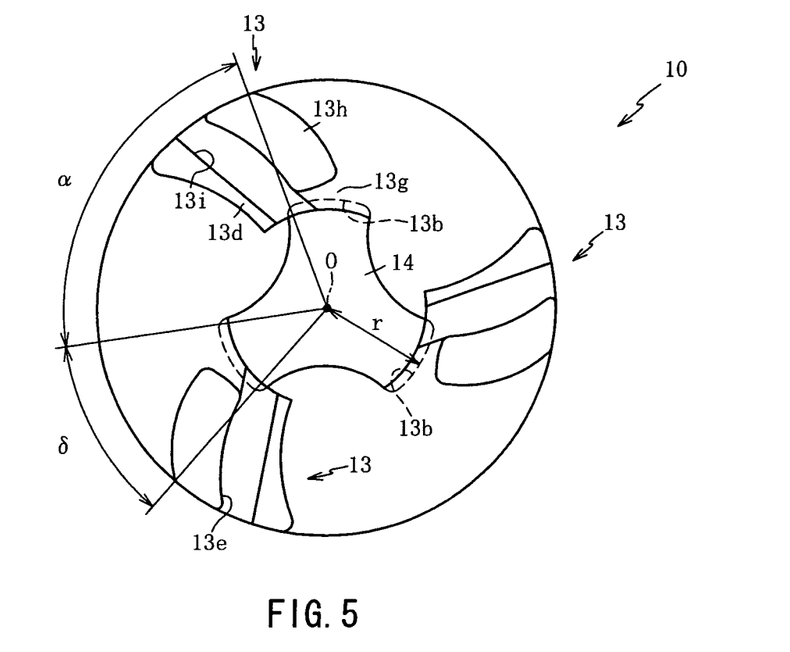
FIG. 5 is a plan view showing the body.
Figure 6:
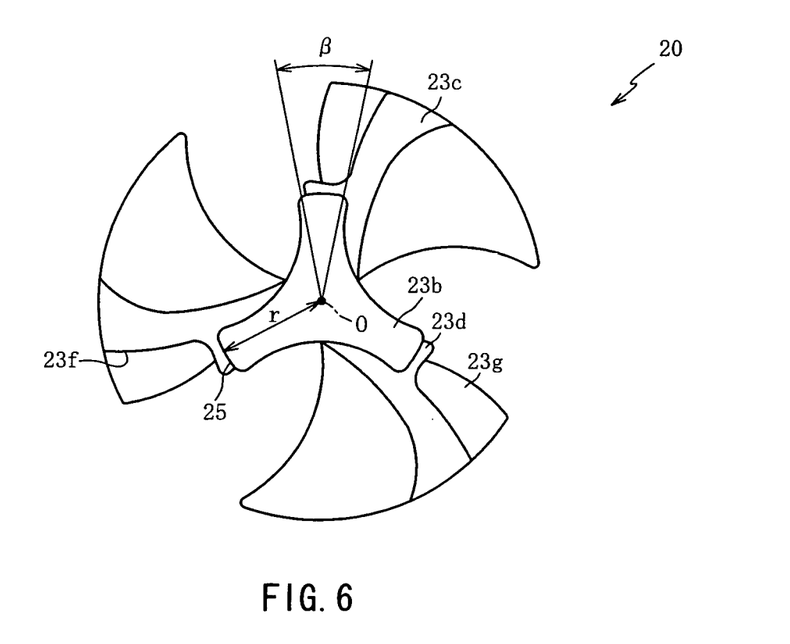
FIG. 6 is a bottom view showing the throw-away tip.

The relationship between the standing portions 13 of the body 10 and the convex connection 23 of the throw-away tip 20 will be described with reference to FIGS. 5 and 6. FIG. 5 is a plan view of the body 10, and FIG. 6 is a bottom view of the throw-away tip 20. As shown in FIG. 5, an angular distance α between the standing portions 13 of the body 10 with respect to the axial core O (an angle formed by two straight lines connecting the respective adjacent standing portions 13 to the axial core O, respectively, on a plane orthogonal to the axial core O) is set to be larger than an angular distance β between both ends of the protrusion 25 (or the outer peripheral wall sliding contact portion 23a1 (refer to FIG. 3)) of the throw-away tip 20 (refer to FIG. 6) (an angle formed by two straight lines connecting ends of the protrusion 25 or the outer peripheral wall sliding contact portion 23a1 to the axial core O, respectively, on a plane orthogonal to the axial core O). Also, a distance r from the axial core O of the body 10 to the inner peripheral groove 13b is set to be the same length as a distance r from the axial core O of the throw-away tip 20 to the protrusion 25.

With the above configuration, the protrusions 25 of the convex connection 23 of the throw-away tip 20 can be inserted between the standing portions 13 of the body 10. Further, the outer peripheral wall sliding contact portions 23a1 (refer to FIG. 3) and the outer peripheral wall step portion 23e of the convex connection 23 at least partially contact with the inner peripheral walls 13a and the inner peripheral wall step portions 13g of the standing portions 13 of the body 10 (refer to FIG. 2), and the plural standing portions 13, the plural outer peripheral wall sliding contact portions 23a1 (refer to FIG. 3), and the plural outer peripheral wall step portions 23e are disposed around the axial core O. Therefore, when the throw-away tip 20 is relatively rotated about the axial core O with respect to the body 10, the convex connection 23 (refer to FIG. 3) is held at a position of the axial core O inside the standing portions 13 so that the protrusions 25 can be fitted into the inner peripheral grooves 13b.

Also, an angular distance δ of the inner peripheral groove 13b recessed in each standing portion 13 of the body 10 (refer to FIG. 5) (an angle formed by two straight lines connecting both ends of the inner peripheral groove 13b to the axial core O, respectively, on a plane orthogonal to the axial core O) is set to be larger than the angular distance β between the protrusions 25 of the throw-away tip 20 (refer to FIG. 6). Further, the transmission wall receiving portions 23f of the throw-away tip 20 (refer to FIG. 6) are formed at positions displaced from the protrusions 25 taking the torsion angle of the second grooves 22 into consideration. Therefore, the protrusions 25 are fitted into the inner peripheral grooves 13b (refer to FIG. 5), and the throw-away tip 20 rotates until the transmission wall receiving portions 23f of the throw-away tip 20 abuts against the torque transmission walls 13e of the body 10. As a result, the first tilt portions 25b continuous to the sliding contact portions 25a can be received in the inner peripheral grooves 13b.

Also, the first receiving portions 23c, the second receiving portions 23d, the third receiving portions 23g, and the transmission wall receiving portions 23f of the throw-away tip 20 are set to coincide in position with the first surfaces 13d, the second surfaces 13g, the third surfaces 13h, and the torque transmission walls 13e of the body 10, respectively. Therefore, when the protrusions 25 are fitted into the inner peripheral grooves 13b, the first receiving portions 23c, the second receiving portions 23d, the third receiving portions 23g, and the transmission wall receiving portions 23f of the throw-away tip 20 can contact with the first surfaces 13d, the second surfaces 13g, the third surfaces 13h, and the torque transmission walls 13e of the body 10, respectively.

Figure 7A:
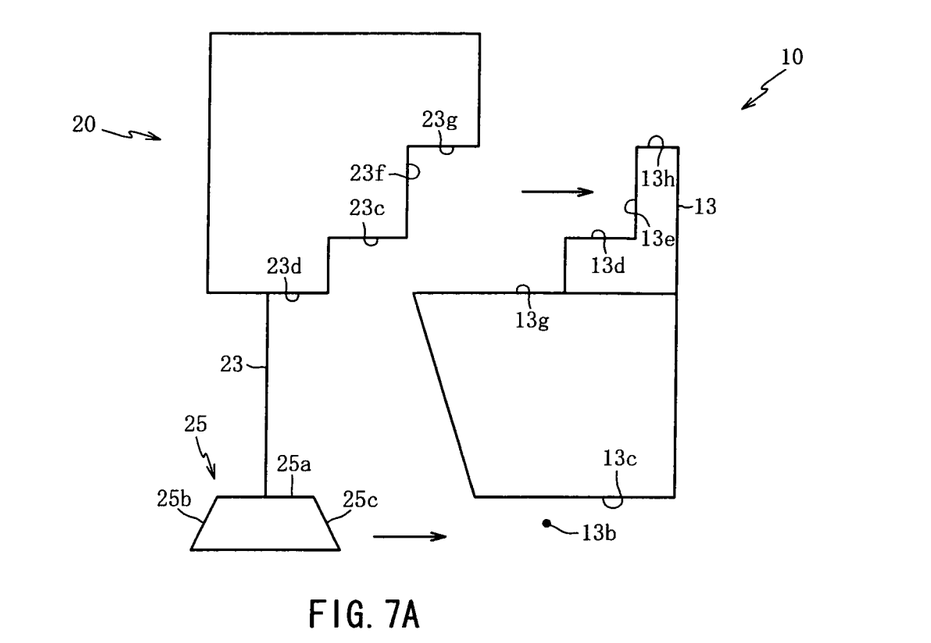
Figure 7B:
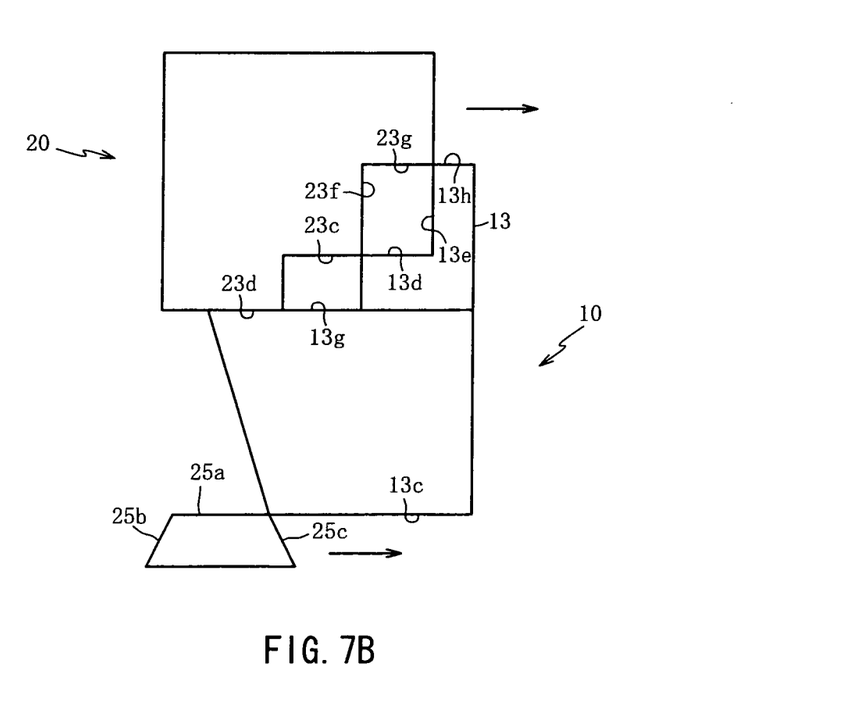

The relationship between the first surfaces 13d, the second surfaces 13g, the third surfaces 13h of the body 10, and the protrusions 25 of the throw-away tip 20 will be described with reference to FIG. 7. FIG. 7(a) is a schematic view of the body 10 and the throw-away tip 20, and FIG. 7(b) is a schematic view of the throw-away tip 20 held by the body 10. FIG. 7 are schematic diagrams showing the throw-away tip 20 and the body 10 planarly developed in the relative rotation direction of the throw-away tip 20 and the body 10. Also, the rotation direction of the throw-away tip 20 is indicated by arrows. When each first receiving portion 13d of the body 10 relatively rotates the throw-away tip 20, and the sliding contact portion 25a of each protrusion 25 contacts with the wall 13c of each inner peripheral groove 13b in the body 10 (refer to FIG. 7(b)), the leading end side (right side in FIG. 7) of rotation of the first receiving portion 23c is located so as to face the first surface 13d.

As a result, when the sliding contact portion 25 contacts with the wall 13c of the inner peripheral groove 13b, the wall 13c of the inner peripheral groove 13b and the first surface 13d are held between the sliding contact portion 25a and the first receiving portion 23c to hold the throw-away tip 20. The protrusion 25 can enter the inner peripheral groove 13b by a small force due to the wedge effect of the second tilt portion 25c until the sliding contact portion 25a of the protrusion 25 contacts with the wall 13c of the inner peripheral groove 13b into a state shown in FIG. 7(b) where the throw-away tip 20 is held by the body 10. Then, the throw-away tip 20 is further rotated (the throw-away tip 20 travels to the right side of FIG. 7) by application of a larger force to fit the sliding contact portion 25c of the protrusion 25 into the inner peripheral groove 13b so that the throw-away tip 20 can be completely connected to the body 10.

As described above, in the operation of attaching the throw-away tip 20 to the body 10, the throw-away tip 20 is rotated by the wedge effect of the second tilt portion 25c so that the protrusion 25 can enter the inner peripheral groove 13b by a relatively small force until the sliding contact portion 25a of the protrusion 25 contacts with the wall 13c of the inner peripheral groove 13b. Then, a replacement tool (not shown) is gripped, and can be connected to the body 10 by applying a large force to the throw-away tip 20. When the sliding contact portion 25a of the protrusion 25 contacts with the wall 13c of the inner peripheral groove 13b, the throw-away tip 20 is held by the body 10. Therefore, even if the replacement tool is regripped, the throw-away tip 20 will not freely come out from the body 10. Accordingly, there is an advantage that the work of attaching the throw-away tip to the body can be improved in safety. Accordingly, the operation of attaching the throw-away tip 20 to the body 10 can be improved in stability.

Further, the third receiving portion 23g is formed so that its leading end side (right side in FIG. 7) of rotation is located to face the third surface 13h when the leading end side of rotation (right side in FIG. 7) of the first receiving portion 23c faces the first surface 13d. Therefore, the wall 13c of the inner peripheral groove 13b and the third surface 13h are held between the sliding contact portion 25a and the third receiving portion 23g of the throw-away tip 20 so that the throw-away tip 20 can be further rigidly held by the body 10. The work of attaching the throw-away tip 20 can be further enhanced in stability.

Further, since the second receiving portion 23d and the second surface 13g are provided, the second receiving portion 23d of the throw-away tip 20 faces with the second surface 13g of the body 10 before the leading end side of rotation (right side in FIG. 7) of the first receiving portion 23c faces the first surface 13d. As a result, in addition to that the wall 13c of the inner peripheral groove 13b and the first surface 13d are held between the sliding contact portion 25a and the first receiving portion 23c of the throw-away tip 20, the wall 13c of the inner peripheral groove 13b and the second surface 13g are held between the sliding contact portion 25a and the second receiving portion 23d of the throw-away tip 20. As a result, the throw-away tip 20 is further rigidly held, and the stability of the attaching work can be further enhanced.

The protrusion 25 has the second tilt portion 25c continuous to the forward side of rotation (right side in FIG. 7) of the sliding contact portion 25a of the throw-away tip 20 continuous to the sliding contact portion 25a and relatively rotated, and tilted downward to the rear end side (lower side in FIG. 7) of the throw-away tip. Therefore, the second tilt portion 25c fitted into the inner peripheral groove 13b travels within the inner peripheral groove 13b ahead of the sliding contact portion 25a. Due to the wedge effect of the second tilt portion 25c traveling ahead, each standing portion 13 of the body 10 is elastically deformed so as to be tilted slightly outward, and a force allowing the sliding contact portion 25a continuous to the second tilt portion 25c to be pushed toward the wall 13c of the inner peripheral groove 13b can be reduced. As a result, the sliding contact portion 25a of each protrusion 25 can be gently fitted into the inner peripheral groove 13b, and the attaching workability of the throw-away tip 20 can be improved. Also, because the outer diameter of the throw-away tip 20 is larger than the outer diameters of the convex connection 23 and the protrusion 25, when they relatively rotate through the second groove 22 of the throw-away tip 20, the protrusion 25 is easily fitted into the inner peripheral groove 13b based on the principle of leverage.

Then, in detaching the throw-away tip 20 after the throw-away tip 20 has been attached to the body 10, since each protrusion 25 has the first tilt portion 25b configured to be received in the inner peripheral groove 13b, continuous to the backward side of rotation (left side in FIG. 7) of the sliding contact portion 25a, and tilted downward toward the rear end side (lower side in FIG. 7) of the throw-away tip 20, the first tilt portion 25b rotates ahead of the sliding contact portion 25a by application of a force for relatively rotating the throw-away tip 20 with respect to the body 10 (the force direction is opposite to a direction at the time of conducting the attaching operation). Since the neighborhood of the sliding contact portion 25a of the first tilt portion 25b that rotates ahead is abutted against the wall 13c of the inner peripheral groove 13b, each standing portion 13 of the body 10 is elastically deformed so as to be tilted slightly outward due to the wedge effect. As a result, the force allowing the sliding contact portion 25a continuous to the first tilt portion 25b to be pushed toward the wall 13c of the inner peripheral groove 13b is reduced, and the sliding contact portion 25a of the protrusion 25 can be gently removed from the inner peripheral groove 13b. Similarly, in conducting the detaching operation, the second groove 22 of the throw-away tip 20 is gripped and relatively rotated so that the protrusion 25 can be relatively easily rotated based on the principle of leverage.

As a result, the motion and speed of the throw-away tip 20 that is detached from the body 10 can be controlled so as to prevent a finger from being cut by the cutting edge 21, and prevent the throw-away tip 20 from colliding with the body 10. Also, because the momentum of the throw-away tip 20 that is detached can be reduced, even if the throw-away tip 20 collides with the body 10, the body 10 can be prevented from being deformed or damaged, and the detaching workability can be improved.

The throw-away rotating tools according to a second embodiment, a third embodiment, and a fourth embodiment will be described with reference to FIG. 8. In the first embodiment, a description is given of a case in which the sliding contact portion 25a, the first tilt portion 25b, and the second tilt portion 25c of each protrusion 25 in the throw-away tip 20 are configured as substantially a cone as a whole. Alternatively, in the throw-away rotating tools according to the second embodiment, the third embodiment, and the fourth embodiment, a description will be given of a case in which sliding contact portions 26a, 27a, 28a, first tilt portions 26b, 27b, 28b, and second tilt portions 26c, 27c, 28c of protrusions 26, 27, 28 in the throw-away tip are configured as substantially a cylinder or substantially a prism as a whole. In FIG. 8, the diagrammatic representation of the outer peripheral wall groove portion 23a2 of the convex connection 23 is omitted. Also, the same parts as those in the first embodiment are denoted by identical symbols, and their description will be omitted.

Figure 8A:
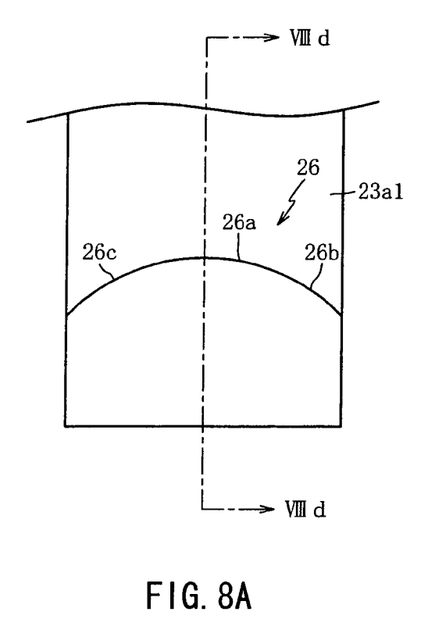
Figure 8B:
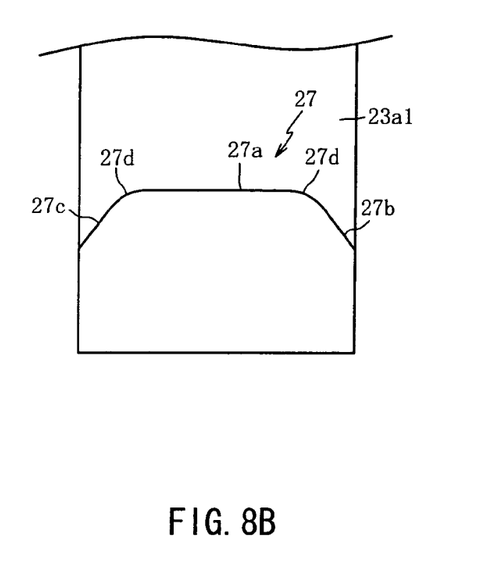
Figure 8C:
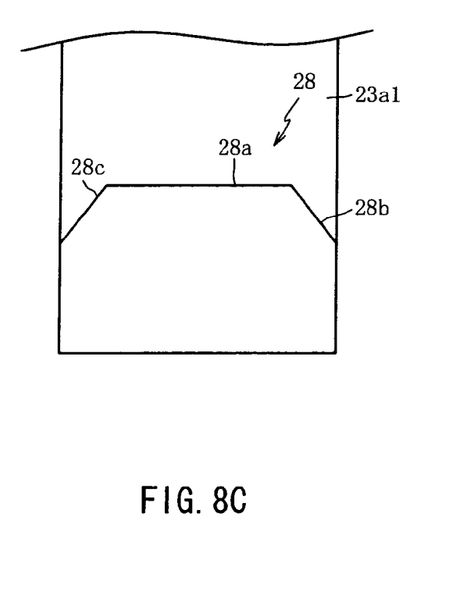
Figure 8D:
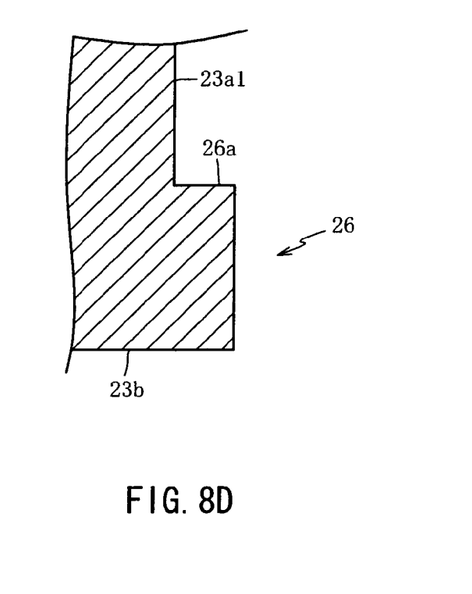

FIG. 8(a) is a front view of the protrusion 26 of the throw-away tip in the throw-away rotating tool according to the second embodiment of the present invention, FIG. 8(b) is a front view of the protrusion 27 of the throw-away tip in the throw-away rotating tool according to the third embodiment of the present invention, FIG. 8(c) is a front view of the protrusion 28 of the throw-away tip in the throw-away rotating tool according to the fourth embodiment of the present invention, and FIG. 8(d) is an end view of a cross section of the protrusion 26 taken along a line VIIId-VIIId of FIG. 8(a).

The protrusion 26 of the throw-away tip shown in FIG. 8(a) has the first tilt portion 26b and the second tilt portion 26c which are tilted downward in a curved line on both sides of the sliding contact portion 26a taken from a front view. As shown in FIG. 8(d), the sliding contact portion 26a is formed substantially in parallel to the rear end portion 23b, and the sliding contact portion 26a, the first tilt portion 26b, and the second tilt portion 26c are formed substantially cylindrically as a whole. As a result, as compared with the case of the first embodiment, a friction between the wall 13c of the inner peripheral groove 13b in the body 10 and the sliding contact portion 26a is increased so as to more rigidly fix the throw-away tip 20.

The protrusion 27 of the throw-away tip shown in FIG. 8(b) has the first tilt portion 27b and the second tilt portion 27c which are tilted linearly downward on both sides of the sliding contact portion 27a taken from a front view. Chamfers 27d are formed on both of a ridge line where the sliding contact portion 27a intersects with the first tilt portion 27b, and a ridge line where the sliding contact portion 27a intersects with the second tilt portion 27c. As in the second embodiment shown in FIG. 8(d), the sliding contact portion 27a of the protrusion 27 is formed substantially in parallel to the rear end portion 23b. As a result, as compared with the case of the first embodiment, a friction between the wall 13c of the inner peripheral groove 13b in the body 10 and the sliding contact portion 27a is increased, and a contact area between the sliding contact portion 27a and the wall 13c is increased so as to more rigidly fix the throw-away tip 20. Also, since the chamfers 27d are formed, the protrusion 27 can be prevented from being damaged, for example, chipped.

The protrusion 28 of the throw-away tip shown in FIG. 8(c) has the first tilt portion 28b and the second tilt portion 28c which are tilted linearly downward on both sides of the sliding contact portion 28a taken from a front view. As in the second embodiment shown in FIG. 8(d), the sliding contact portion 28a of the protrusion 28 is formed substantially in parallel to the rear end portion 23b. As a result, as compared with the case of the first embodiment, a friction between the wall 13c of the inner peripheral groove 13b in the body 10 and the sliding contact portion 28a is increased, and a contact area between the sliding contact portion 28a and the wall 13c is increased so as to more rigidly fix the throw-away tip 20.

Figure 9:
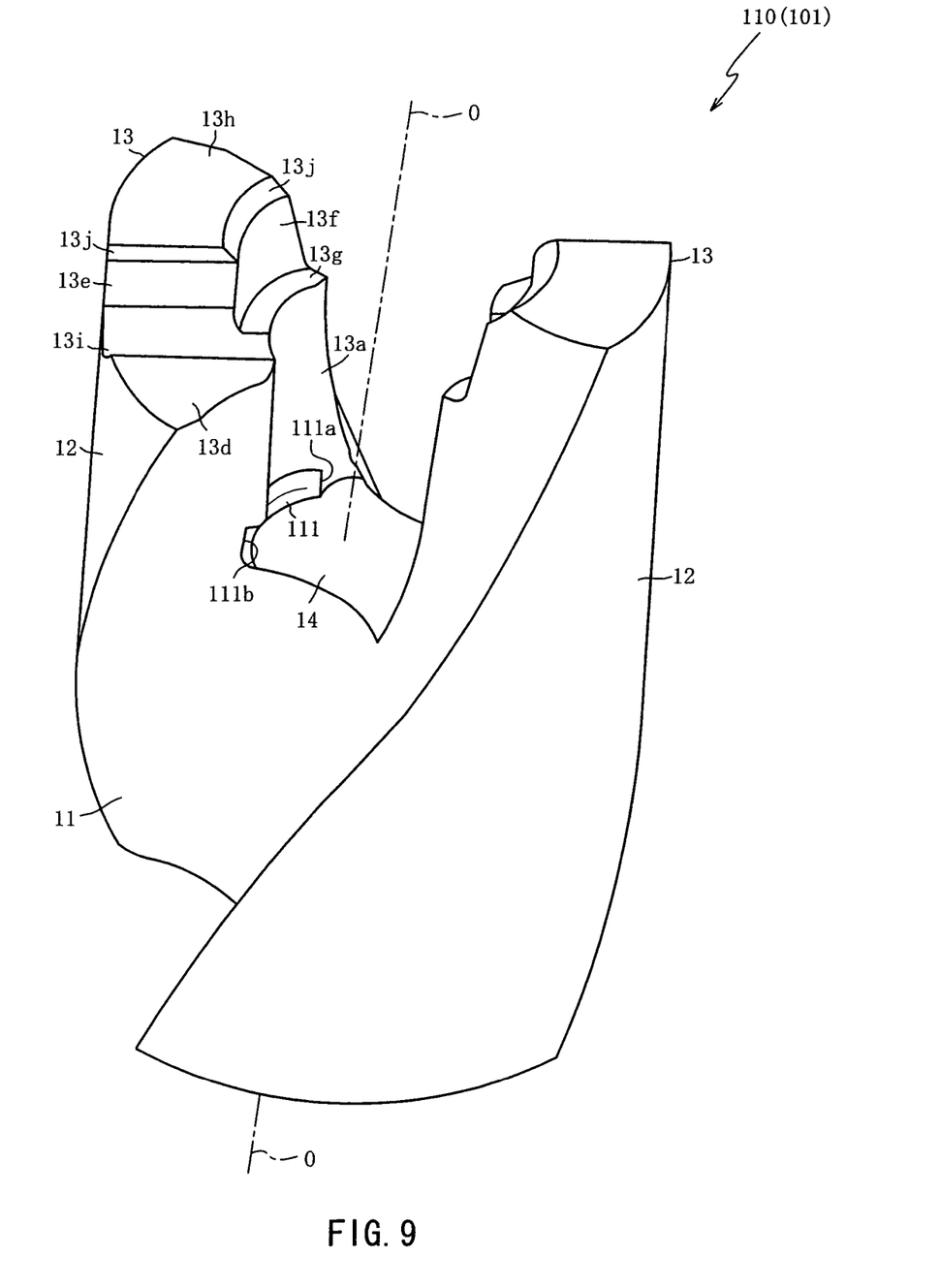
FIG. 9 is a perspective view showing a body of a throw-away rotating tool according to a fifth embodiment of the present invention.
Figure 10:
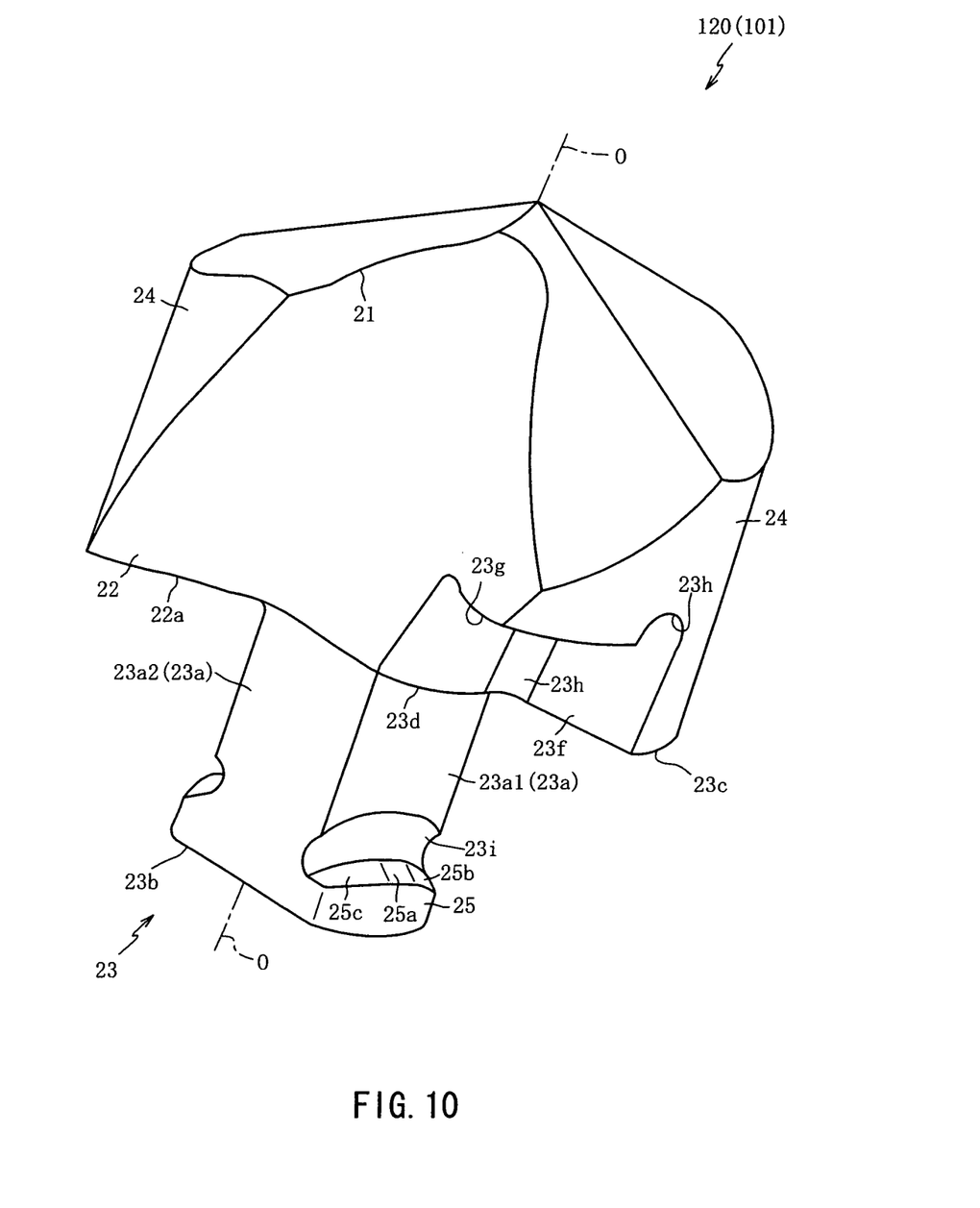
FIG. 10 is a perspective view showing a throw-away tip of the throw-away rotating tool according to the fifth embodiment of the present invention.

Subsequently, a fifth embodiment will be described with reference to FIGS. 9 and 10. In the first embodiment, the throw-away rotating tool 1 having the three cutting edges 21, the three first grooves 11, and the three second grooves 22 is described. On the contrary, in the fifth embodiment, a throw-away rotating tool 101 having two cutting edges 21, two first grooves 11, and two second grooves 22 will be described. FIG. 9 is a perspective view of a body 110 of the throw-away rotating tool 101 according to the fifth embodiment of the present invention, and FIG. 10 is a perspective view of a throw-away tip 120 of the throw-away rotating tool 101 according to the fifth embodiment. In FIG. 9, the diagrammatic representation of an axial length of the body 110 is omitted. The same parts as those in the first embodiment are denoted by identical symbols, and their description will be omitted.

As shown in FIG. 9, the body 110 is configured to mainly include a plurality of (two in this embodiment) standing portions 13 each extending with a land 12 as an outer peripheral surface, and parts of the first grooves 11 as side surfaces, and standing around an axial core O with a torsion angle of the first grooves 11, and a bottom 14 located on a rear end side (lower side in FIG. 9) of the standing portions 13.

An inner peripheral groove 111 is recessed in the inner peripheral wall 13a of each standing portion 13 along the bottom 14 in an arc shape about the axial core O. Each of the inner peripheral grooves 111 has one end 111a within the inner peripheral wall 13a, and another end 111b that communicates with the first groove 11. In the second embodiment, the one end 111a of the inner peripheral groove 111 does not communicate with the first groove 11 (depth side of a paper surface in FIG. 9), and the one end 111a is defined within the inner peripheral wall 13a. Therefore, the thickness (wall thickness) of each standing portion 13 is prevented from being thinned more than necessary by the inner peripheral groove 111. As a result, a mechanical strength of the standing portions 13 in the bending direction can be prevented from being deteriorated, and a reaction force of the elastic deformation of the standing portions 13 can be prevented from being deteriorated. Each protrusion 25 of a throw-away tip 120 can be inserted from the another end 111b side of the inner peripheral groove 111 that communicates with the first groove 11. As a result, as in the throw-away rotating tool 1 according to the first embodiment, in the throw-away rotating tool 101 according to the second embodiment, the throw-away tip 120 can be fixed to the body 110.

The present invention has been described above with reference to the embodiments. However, the present invention is not limited to the above embodiments, but it can be easily expected that the present invention can be variously improved or modified without departing from the subject matter of the present invention. For example, numerical values recited in the above embodiments (for example, the quantum and dimensions of each component) are examples, and other numerical values can be applied.

In the above respective embodiments, a description has been given of a case in which the bodies 10 and 110 are made of high-speed tool steel, and the throw-away tips 20 and 120 are made of a cemented carbide, but are not limited to those materials, and other materials can be applied. As other materials, for example, the bodies 10 and 110 can be made of an alloy tool steel, and the throw-away tips 20 and 120 can be made of cermet, superfine particle cemented carbide, or coated cemented carbide.

In the above first embodiment and the above fifth embodiment, the twist drill formed with the first grooves 11 and the second grooves 22 at given torsion angles about the axial core O has been described. However, the present invention is not always limited to this embodiment, but can be applied to a straight drill in which the first grooves 11 and the second grooves 22 are parallel to the axial core O. Also, the present invention can be applied to a throw-away rotating tool having no groove formed in the bodies 10 and 110.

In the above first embodiment and the above fifth embodiment, a description is given of a case in which a distance between the inner peripheral wall 13a of each standing portion 13 and the axial core O is constant in the height direction of the inner peripheral wall 13a. However, the present invention is not limited to this configuration. The distance can be set to be gradually increased in the height direction of the inner peripheral wall 13a, or gradually decreased in the height direction of the inner peripheral wall 13a. In those cases, the thickness of the convex connection 23 is adjusted so that the convex connection 23 of each of the throw-away tips 20 and 120 contacts with the inner peripheral wall 13a according to the size of the inner peripheral wall 13a. This is because in the throw-away rotating tools 1 and 101 according to the present invention, since the protrusions 25 of the throw-away tips 20 and 120 are fitted into the inner peripheral grooves 13b of the bodies 10 and 110 to fix the throw-away tips 20 and 120 to the bodies 10 and 110, respectively, when the convex connection 23 can be held in the inner peripheral wall 13a without backlash, the sizes of the inner peripheral wall 13a and the protrusion connection 23 in the height direction do not affect the fixation of the throw-away tips 20 and 120. Likewise, the inner diameter of the inner peripheral wall 13a can be set to be gradually increased or gradually decreased in the height direction of the inner peripheral wall step portions 13f.

In the above first embodiment and the above fifth embodiment, a description is given of a case in which the inner peripheral grooves 13b and 111 are recessed along the bottoms 14 of the bodies 10 and 110. However, the present invention is not always limited to this configuration. The inner peripheral grooves 13b and 111 can be recessed at arbitrary locations of the inner peripheral walls 13a or the inner peripheral wall step portions 13f of the standing portions 13.

In the above first embodiment and the above fifth embodiment, a description is given of a case in which the second surfaces 13g are formed on the bodies 10 and 110, and the second receiving portions 23d are formed on the throw-away tips 20 and 120. However, the present invention is not always limited to this configuration. Alternatively, it is possible that both of the second surfaces 13g and the second receiving portions 23d are not provided. Similarly, in this case, the torque transmission walls 13e of the bodies 10 and 110 contact with the transmission wall receiving portions 23f of the throw-away tips 20 and 120 so that the rotating force of a processing machine such as a machining center can be transmitted to the throw-away tips 20 and 120 through the bodies 10 and 110. In addition, the first surfaces 13d of the bodies 10 and 110 contact with the first receiving portions 23c of the throw-away tips 20 and 120 so that the throw-away tips 20 and 120 can be rigidly fixed to the bodies 10 and 110.

The invention claimed is:

1. A throw-away rotating tool comprising:
a body having a plurality of standing portions that erect around an axial core thereof at intervals; and
a throw-away tip made of a material harder than the body and having a convex connection projected on a rear end thereof, in which the convex connection is inserted into the inside of the standing portions, and relatively rotated about the axial core to connect the convex connection and the standing portions,
wherein each of the standing portions has an inner peripheral groove orthogonal to the axial core and recessed in an inner peripheral wall thereof,
wherein the convex connection has a protrusion configured to be projected from an outer peripheral wall thereof and detachably fitted into the inner peripheral groove, and formed with a sliding contact portion of the inner peripheral groove which contacts with a wall of a leading end side of the body,
wherein the protrusion has a first tilt portion continuous to a rear side of rotation of the sliding contact portion of the throw-away tip that is relatively rotated,
wherein the first tilt portion is tilted downward from the sliding contact portion toward a rear end side of the throw-away tip,
wherein the protrusion has a second tilt portion continuous to a front side of rotation of the throw-away tip that is relatively rotated, and
wherein the second tilt portion is tilted downward from the sliding contact portion toward a rear end side of the throw-away tip.

2. The throw-away rotating tool according to claim 1,
wherein the body has a first surface formed on the leading end side of each of the standing portions in a direction crossing to the axial core,
wherein the throw-away tip has a first receiving portion which is projected toward the outer peripheral side from the convex connection in the direction crossing to the axial core, and contacts with the first surface when the convex connection and the standing portions are connected to each other, and
wherein when the first receiving portion is formed at a position where the leading end side of rotation laps over the first surface when the throw-away tip is relatively rotated about the axial core, and the sliding contact portion contacts with the wall of the inner peripheral groove.

* * * * *